United States Patent [19]
Egawa

[11] Patent Number: 6,155,712
[45] Date of Patent: *Dec. 5, 2000

[54] RADIATION CLINICAL THERMOMETER

[75] Inventor: Shunji Egawa, Tokorozawa, Japan

[73] Assignee: Citizen Watch Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/860,480

[22] PCT Filed: Nov. 7, 1996

[86] PCT No.: PCT/JP96/03261

§ 371 Date: Jun. 27, 1997

§ 102(e) Date: Jun. 27, 1997

[87] PCT Pub. No.: WO97/17887

PCT Pub. Date: May 22, 1997

[30] Foreign Application Priority Data

Nov. 13, 1995 [JP] Japan ..................................... 7-294117

[51] Int. Cl.$^7$ ................................. G01J 5/00; A61B 6/00
[52] U.S. Cl. ......................... 374/126; 374/128; 374/130; 374/133; 600/474
[58] Field of Search ..................................... 374/121, 126, 374/128, 129–133; 128/664, 736; 600/374, 375; 702/99, 131–135

[56] References Cited

U.S. PATENT DOCUMENTS

| | | | |
|---|---|---|---|
| 5,024,533 | 6/1991 | Egawa et al. | 374/126 |
| 5,150,969 | 9/1992 | Goldberg et al. | 374/128 |
| 5,159,936 | 11/1992 | Yelderman . | |
| 5,293,877 | 3/1994 | O'Hara et al. | 374/133 |
| 5,640,015 | 6/1997 | Kienitz et al. | 374/126 |

FOREIGN PATENT DOCUMENTS

| | | |
|---|---|---|
| 60-119179 | 6/1985 | Japan . |
| 2-28524 | 1/1990 | Japan . |
| 5-115443 | 5/1993 | Japan . |
| 6-502099 | 3/1994 | Japan . |
| 6-142063 | 5/1994 | Japan . |
| 6-300635 | 10/1994 | Japan . |
| 7-178061 | 7/1995 | Japan . |

*Primary Examiner*—Vit Miska
*Attorney, Agent, or Firm*—Townsend and Townsend and Crew LLP

[57] ABSTRACT

A radiation clinical thermometer that measures body temperature within a short period of time. The radiation clinical thermometer includes an infrared sensor for outputting an infrared detection signal upon reception of thermal radiations from an object to be measured, optical wave-guide structure for guiding the thermal radiations from the object to be measured to the infrared sensor, a temperature sensor for measuring a reference temperature and outputting a reference temperature signal, temperature difference structure for detecting a temperature difference between the infrared sensor and the optical wave-guide structure and outputting a temperature difference signal, and temperature calculation structure for receiving the infrared detection signal, the reference temperature signal, and the temperature difference signal in calculating a temperature data signal by correcting an error based on the temperature difference. The temperature calculation structure includes correction coefficient adjusting structure for adjusting a correction coefficient for the temperature difference signal.

26 Claims, 16 Drawing Sheets

F I G. 1
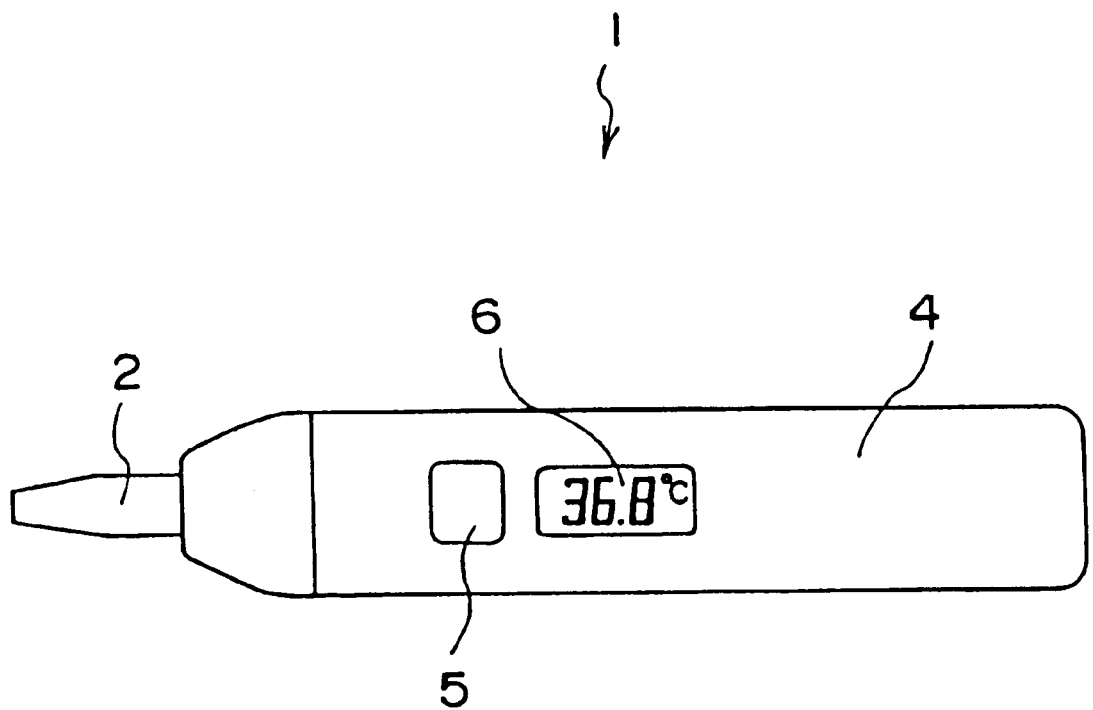

RADIATION CLINICAL THERMOMETER

TECHNICAL FIELD

The present invention relates to a radiation clinical thermometer for performing noncontact temperature measurement by detecting thermal radiation energy and, more particularly, to temperature compensation in an optical system.

BACKGROUND ART

A radiation clinical thermometer has been proposed to measure a body temperature within a short period of time. This instrument is designed to perform noncontact measurement of the temperature of an eardrum selected as a measurement portion.

For example, such radiation clinical thermometer is disclosed in Japanese Unexamined Patent Publication No. 61-117422 wherein the head portion of the probe unit is inserted into the external acoustic meatus, and thermal radiations from the eardrum are focused to an infrared sensor by an optical waveguide placed in the head portion, thereby measuring the eardrum temperature. The probe unit with this infrared sensor includes a heating control means for preheating the head portion to a reference temperature (36.5° C.). The head portion is preheated to a temperature near the body temperature, and calibration is performed in advance in this state. With this operation, when the head portion is inserted into the external acoustic meatus, the temperature of the head portion undergoes no change. For this reason, measurement errors caused by changes in the temperature of the head portion can be eliminated. That is, the inner surface of the optical waveguide must be set equal in temperature to that of the infrared sensor itself so as to prevent thermal radiations from the optical waveguide itself from causing measurement errors. In order to prevent a change in the temperature of the head portion upon insertion into the external acoustic meatus, the temperature of the head portion is stabilized at the reference temperature (36.5° C.). With this setting, thermal radiations from the inner surface of the optical waveguide can be neglected.

The radiation clinical thermometer disclosed in Japanese Unexamined Patent Publication No. 61-117422, however, requires a heating control device with a high control accuracy. For this reason, the structure and circuit configuration of this instrument are complicated, and its size increases, resulting in an increase in cost. In addition, a long stabilization time is required to preheat the head portion and control its temperature to a constant temperature. Furthermore, high energy is required to drive the heating control device. This scheme cannot therefore be applied to a portable clinical thermometer using a compact battery as an energy source.

Under the circumstances, a radiation clinical thermometer with a high temperature measurement accuracy has been proposed, which is a compact, portable clinical thermometer having no heating control device. When the probe of this instrument is inserted into the external acoustic meatus to measure the eardrum temperature, the temperature of the probe changes. However, this change causes no error.

For example, such radiation clinical thermometer is disclosed in Japanese Unexamined Patent Publication No. 2-28524. Similar to the radiation clinical thermometer disclosed in Japanese Unexamined Patent Publication No. 61-117422, the radiation clinical thermometer disclosed in Japanese Unexamined Patent Publication No. 2-28524 uses an optical waveguide as an optical system for focusing thermal radiations from the eardrum. However, this instrument has no heating control device for the infrared sensor, and hence the infrared sensor and the optical waveguide are kept at almost the ambient temperature, i.e., room temperature. The first temperature sensor is arranged near the infrared sensor, and the second temperature sensor is arranged in the optical waveguide. A temperature is measured on the basis of the temperatures of the infrared sensor and the optical waveguide. If the difference in temperature between the infrared sensor and the optical waveguide is extraordinarily large, measurement is inhibited. If the temperature difference is smaller than a predetermined value, measurement is permitted in spite of the temperature difference. Body temperature data is then calculated in consideration of the temperatures of the infrared sensor and the optical waveguide. In this radiation clinical thermometer, an operation of calculating body temperature data is performed by a microcomputer on the basis of the output voltage from the infrared sensor, the output temperature from the first temperature sensor for measuring the temperature of the infrared sensor, and the output temperature from the second temperature sensor for measuring the temperature of the optical waveguide. When, for example, the probe is in the external acoustic meatus, the temperature of the optical waveguide gradually rises while the temperature of the infrared sensor hardly changes. For this reason, a temperature difference is caused between the infrared sensor and the optical waveguide. However, since body temperature data is calculated in consideration of these temperatures, an error caused by this temperature difference can be eliminated.

The following problems, however, are posed in the radiation clinical thermometer disclosed in Japanese Unexamined Patent Publication No. 2-28524. Since body temperature data is calculated by using a complicated equation based on a total of three variables, i.e., the temperature data obtained by the two temperature sensors and the output from the infrared sensor, the microcomputer requires a complicated program for this operation, and a long time for arithmetic processing. Furthermore, in the complicated equation used for this operation, constants such as the emissivity of the optical waveguide must be measured and set in advance. However, this setting is also difficult to perform.

The present applicant has disclosed a radiation clinical thermometer is Japanese Unexamined Patent Publication No. 6-142063, which uses an analog circuit to correct an error caused by the difference in temperature between first and second temperature sensors on the basis of the output voltage from an infrared sensor, the output temperature from the first temperature sensor adapted to measure the temperature of the infrared sensor, and the output temperature from the second temperature sensor adapted to measure the temperature of an optical waveguide.

The radiation clinical thermometer disclosed in U.S. Pat. No. 5,159,936 includes a first infrared sensor for receiving thermal radiations from the eardrum and thermal radiations from an optical waveguide itself, and a second infrared sensor for receiving only thermal radiations from the optical waveguide itself. This instrument is designed to correct an error caused by the difference in temperature between the optical waveguide and the infrared sensors by subtracting the output from the second infrared sensor from the output from the first infrared sensor.

Assume that the second temperature sensor is mounted on the probe unit of the radiation clinical thermometer disclosed in Japanese Unexamined Patent Publication No. 6-142063 to measure the temperature of the optical waveguide. In this case, the mounting positions of such sensors slightly vary with radiation clinical thermometers. For this reason, when the radiation clinical thermometer disclosed in Japanese Unexamined Patent Publication No. 6-142063 is mass-produced, the measurement results obtained by the respective radiation clinical thermometers include slight errors.

If the output from the second infrared sensor is simply subtracted from the output from the first infrared sensor, as in the radiation clinical thermometer disclosed in U.S. Pat. No. 5,159,936, a body temperature as a measurement result includes an error because of the influences and the like of a shielding plate for shielding the second infrared sensor from thermal radiations from an object to be measured.

DISCLOSURE OF INVENTION

It is an object of the present invention to provide a radiation clinical thermometer which can improve the accuracy of a body temperature as a measurement result.

In order to achieve the above object, according to an arrangement of the present invention, there is provided a radiation clinical thermometer comprising an infrared sensor for outputting an infrared detection signal upon reception of thermal radiations from an object to be measured, optical waveguide means for guiding the thermal radiations from the object to be measured to the infrared sensor, a temperature sensor for measuring a reference temperature and outputting a reference temperature signal, temperature difference detection means for detecting a temperature difference between the infrared sensor and the optical waveguide means and outputting a temperature difference signal, and temperature calculation means for receiving the infrared detection signal, the reference temperature signal, and the temperature difference signal and calculating a temperature data signal by correcting an error caused by the temperature difference, characterized in that the temperature calculation means includes correction coefficient adjusting means for adjusting a correction coefficient for the temperature difference signal.

According to the above arrangement of the present invention, since the temperature calculation means includes the correction coefficient adjusting means for adjusting the correction coefficient for the temperature difference signal from the temperature difference detection sensor for detecting the temperature difference between the infrared sensor and the optical waveguide means, a radiation clinical thermometer can be provided, which can calculate temperature data upon properly adjusting the error amount based on the temperature difference between the infrared sensor and the optical waveguide means, and improves the measurement accuracy.

According to the present invention, the temperature calculation means comprises temperature difference correction means for subtracting the temperature difference signal from the infrared detection signal, and temperature data calculation means for calculating the temperature data on the basis of an output signal from the temperature difference correction means and the reference temperature signal, the temperature difference correction means including the correction coefficient adjusting means. Since this temperature difference correction means can be constituted by an analog or digital subtraction means, a corresponding circuit can be formed, as needed.

In addition, the correction coefficient adjusting means is a means for adjusting the contribution of a temperature difference signal to the subtraction means, and a corresponding circuit can be formed in either an analog or digital circuit.

Furthermore, according to the present invention, two different temperature difference conditions are set between the infrared sensor and the optical waveguide means, and the correction coefficient in the correction coefficient adjusting means is adjusted on the basis of the output under each condition. A correct correction coefficient can therefore be set.

BRIEF DESCRIPTION OF DRAWINGS

FIG. 1 is a front view of a radiation clinical thermometer according to the first embodiment of the present invention.

DETAILED DESCRIPTION OF THE PREFERRED EMBODIMENTS

Figure 2:
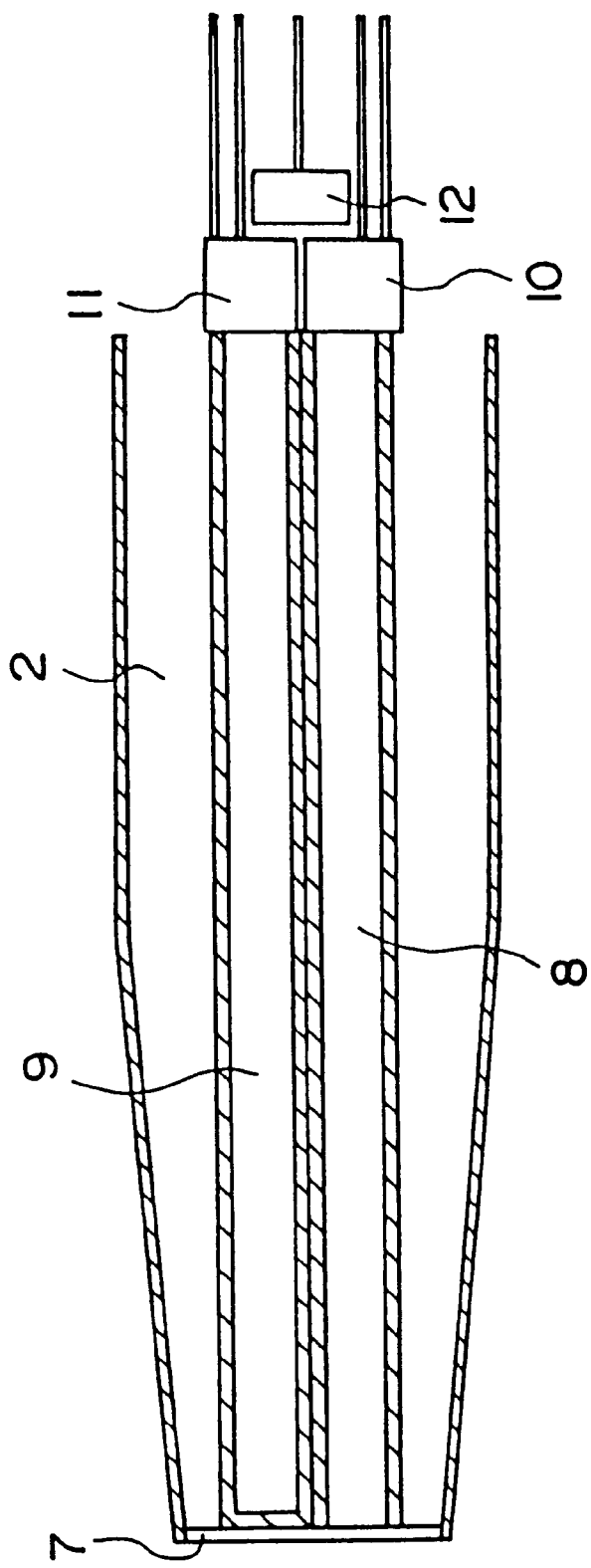
FIG. 2 is a partially cutaway sectional view of the probe of the radiation clinical thermometer in FIG. 1.

The present invention will now be described with reference to the accompanying drawings.

FIG. 1 is a front view of a radiation clinical thermometer according to the first embodiment of the present invention.

A radiation clinical thermometer 1 is a clinical thermometer for measuring an eardrum temperature, and comprises a main body 4 and a probe 2. The main body 4 has a liquid crystal display element 6 for displaying a body temperature and a measurement switch 5 having a pushbutton structure.

The radiation clinical thermometer 1 is operated in the following manner. When the measurement switch 5 is depressed, the radiation clinical thermometer 1 is powered on to start temperature measurement. Thereafter, the probe 2 is inserted into the external acoustic meatus of an object toward the eardrum to measure the eardrum temperature. After the probe 2 is properly directed to the eardrum, the probe 2 is removed from the external acoustic meatus. In this case, since the highest temperature that has been measured is displayed on the liquid crystal display element 6, the eardrum temperature, i.e., the body temperature, is displayed on the liquid crystal display element 6. This display is read as the body temperature of the object.

FIG. 2 is a partially cutaway sectional view of the probe 2 of the radiation clinical thermometer 1 in FIG. 1.

A filter 7 having transmission wavelength characteristics is mounted on the distal end of the probe 2. This filter 7 consists of an optical crystal such as silicon (Si) or barium fluoride ($BaF_2$) or a polymer such as polyethylene, and has a function of selectively transmitting infrared wavelengths and a dustproof function.

An optical waveguide 8 is a pipe for efficiently focusing thermal radiations from the eardrum of the object, and consists of a metal pipe, e.g., a copper, brass, or stainless steel pipe. The inner surface of the optical waveguide 8 is a mirror surface plated with gold (Au) to have a high reflectance. Even with such a process, the inner surface of the optical waveguide 8 cannot be made into a blackbody Planckian radiator having a reflectance of 1.00. The inner surface of the optical waveguide 8 therefore has a slight emissivity.

An optical waveguide 9 consists of the same material as that for the optical waveguide 8. The inner surface of the optical waveguide 9 has undergone the same process as that for the optical waveguide 8. However, one end (on the filter 7 side) of the optical waveguide 9 is sealed such that no infrared radiations from the object enter. The optical waveguide 9 is arranged near the optical waveguide 8 to have the same temperature as that of the optical waveguide 8. The condition required for the optical waveguide 9 is that it has the same temperature as that of the optical waveguide 8. That is, the optical waveguide 9 need not consist of the same material as that for the optical waveguide 8, and need not have the same inner surface state as that of the optical waveguide 8.

A first infrared sensor 10 is a sensor for detecting infrared radiations emitted from the object and focused by the optical waveguide 8. This sensor also detects thermal radiations from the optical waveguide 8 itself. In contrast to this, a second infrared sensor 11 detects thermal radiations from the optical waveguide 9 itself because the distal end of the optical waveguide 9 is sealed. The second infrared sensor 11 is arranged near the first infrared sensor 10 to have the same temperature as that of the first infrared sensor 10. A temperature sensor 12 is a sensor for measuring the temperatures of the first infrared sensor 10 and the second infrared sensor 11.

The principle of the operation using the first and second infrared sensors 10 and 11 will be described below. If the temperature of the optical waveguide 8 is equal to that of the first infrared sensor 10, the first infrared sensor 10 can apparently detect only infrared radiations from the object, even though thermal radiations emitted from the optical waveguide 8. This is because, when the temperature of the optical waveguide 8 is equal to that of the first infrared sensor 10, thermal radiations from the optical waveguide 8 can be neglected in consideration of the balance between the radiations incident on the first infrared sensor 10 and the radiations emitted therefrom. When, however, a temperature difference occurs between the optical waveguide 8 and the first infrared sensor 10, the thermal radiations from the optical waveguide 8 differ from the thermal radiations from the first infrared sensor 10. The first infrared sensor 10 therefore detects both the thermal radiations from the first infrared sensor 10 and the thermal radiations from the optical waveguide 8, and the thermal radiations from the optical waveguide 8 cannot be neglected. For this reason, the radiation clinical thermometer 1 includes the second infrared sensor 11 to detect infrared radiations from the optical waveguide 9 under the same temperature condition as that for the optical waveguide 8, and subtracts, at a proper ratio, the output from the second infrared sensor 11 from the output from the first infrared sensor 10 on which the influences of the temperature of the optical waveguide 8 are exerted, thereby detecting the infrared radiations from the object which are free from the influences of the temperature of the optical waveguide 8.

Figure 3:
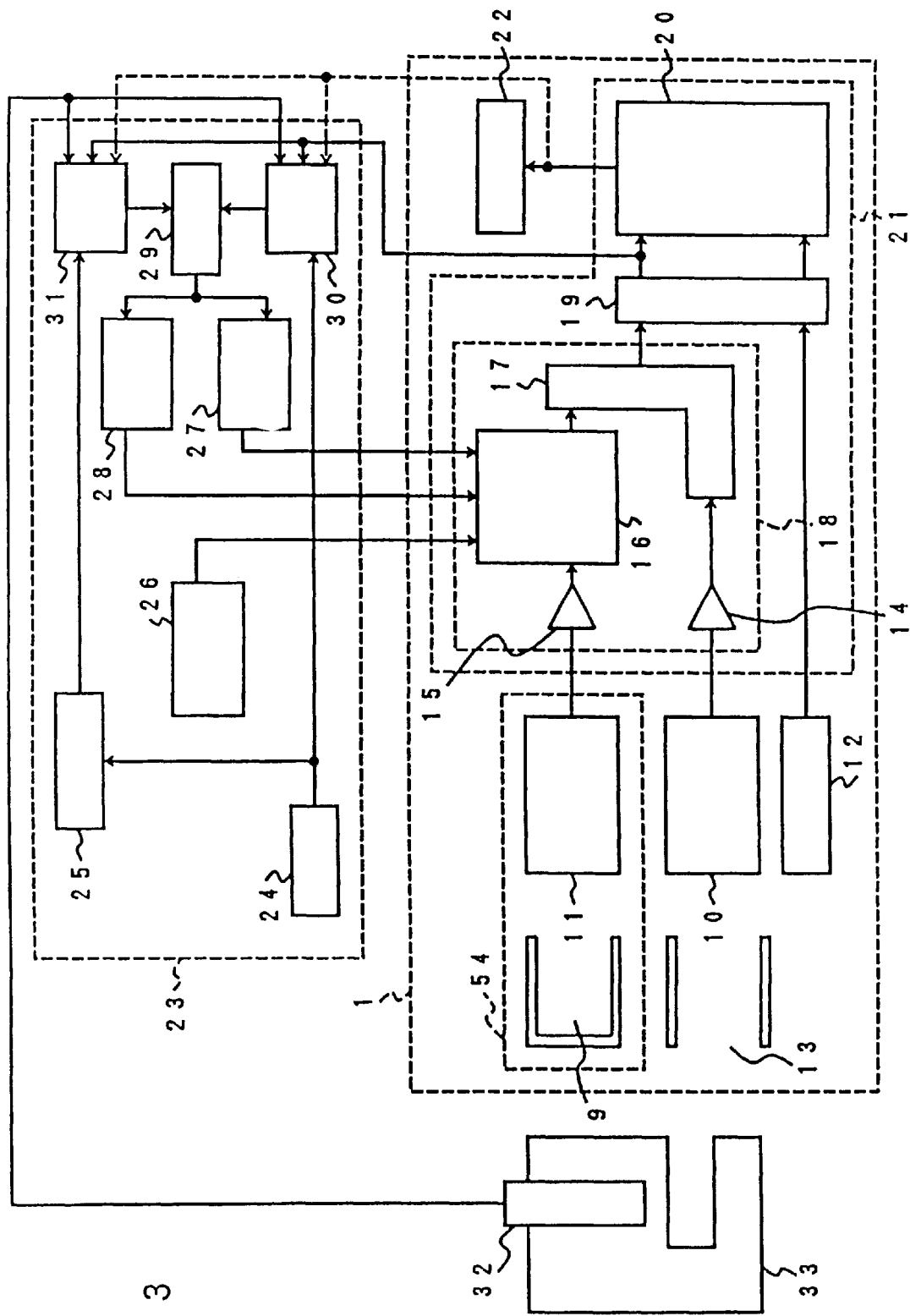
FIG. 3 is a schematic block diagram showing the radiation clinical thermometer and a device which perform correction amount adjustment for the error based on the difference in temperature between the infrared sensor and optical waveguide of the radiation clinical thermometer in FIG. 1.

FIG. 3 is a schematic block diagram showing the radiation clinical thermometer 1 and a device which perform adjustment of the correction amount for an error (to be referred to as "correction amount adjustment" hereinafter) based on the difference in temperature between the infrared sensor and optical waveguide of the radiation clinical thermometer 1 in FIG. 1.

Referring to FIG. 3, reference numerals 23, 32, and 33 respectively denote an adjusting device, a water thermometer, and a blackbody which are used to perform correction amount adjustment for the radiation clinical thermometer 1.

Figure 6:
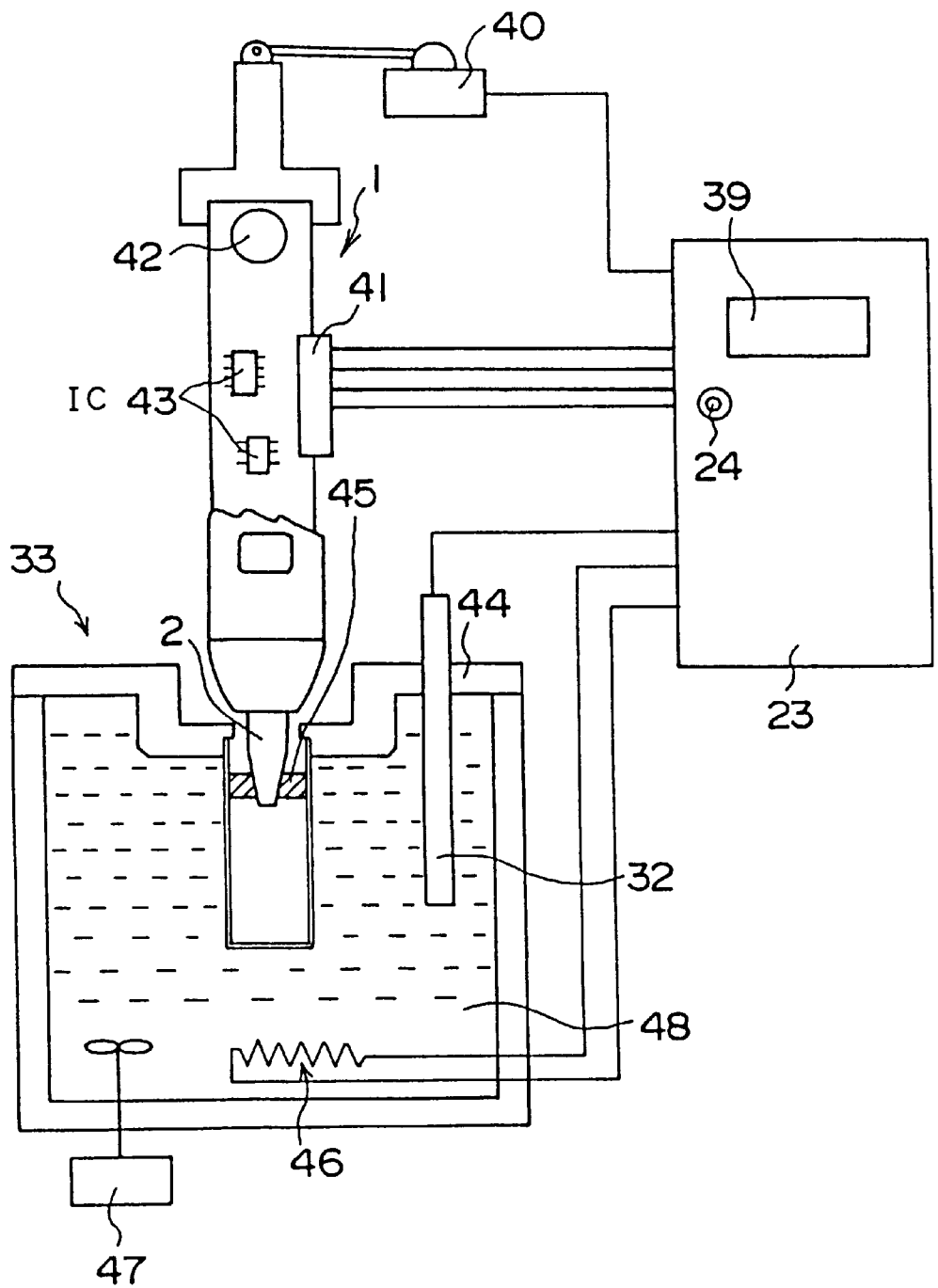
FIG. 6 is a view showing the outer appearance of each device in FIG. 3.

As will be described later, the blackbody 33 is constituted by a thermostatic chamber, as shown in FIG. 6, and the water thermometer 32 measures the water temperature of the thermostatic chamber, i.e., the temperature of the blackbody 33.

The radiation clinical thermometer 1 comprises an optical waveguide means 13 constituted by the filter 7 and the optical waveguide 8 to focus thermal radiations from an object to be measured, the first infrared sensor 10, a temperature difference detection means 54 constituted by the optical waveguide 9 and the second infrared sensor 11, the temperature sensor 12, a temperature calculation means 21 for calculating the temperature of the object on the basis of the outputs from the first infrared sensor 10, the second infrared sensor 11, and the temperature sensor 12, and a display means 22 which has the liquid crystal display element 6 and displays the temperature as the calculation result obtained by the temperature calculation means 21. Referring to FIG. 3, the object is the blackbody 33.

The temperature calculation means 21 comprises a temperature difference correction means 18 for correcting the error based on the difference in temperature between the optical waveguide 8 and the first infrared sensor 10, an A-D converter 19 for converting analog data into digital data, and a temperature data calculation means 20 for calculating the temperature data of the object on the basis of the digital output from the temperature difference correction means 18 and the output from the temperature sensor 12. The temperature difference correction means 18 comprises a first initial-stage amplifier 14 for amplifying the detection signal from the first infrared sensor 10, a second initial-stage amplifier 15 for amplifying the detection signal from the second infrared sensor 11, a correction coefficient adjusting means 16 capable of adjusting a correction coefficient for adjusting the detection signal from the second infrared sensor 11 to a proper value, and a subtraction means 17 for subtracting the detection signal from the second infrared sensor 11, which has been adjusted to the proper value by the correction coefficient adjusting means 16, from the detection signal from the first infrared sensor 10.

The adjusting device 23 comprises a switch 24 for designating the start of correction amount adjustment for the radiation clinical thermometer 1, a timer 25 for monitoring the lapse of a predetermined period of time after the switch 24 is turned on, an adjustment mode notification means 26 for notifying the radiation clinical thermometer 1 that an adjustment mode is being set, a first memory 30 for storing the digital output from the temperature difference correction means 18 which is output through the A-D converter 19, a second memory 31 for storing the digital output from the temperature difference correction means 18 which is output through the A-D converter 19 upon checking the lapse of the predetermined period of time by the timer 25, a comparison means 29 for comparing the value stored in the first memory 30 with the value stored in the second memory 31, a correction coefficient generation means 28 for outputting a new correction coefficient to the correction coefficient adjusting means 16 on the basis of the comparison result obtained by the comparison means 29, and a storage instructing means 27 for instructing the correction coefficient adjusting means 16 to store the currently set correction coefficient on the basis of the comparison result obtained by the comparison means 29.

In correction amount adjustment, the temperature of the blackbody 33 upon storing the output in the first memory 30 may differ from that upon storing the output in the second memory 31. For this reason, every time correction amount adjustment is performed, the temperature of the blackbody 33 is measured by the water thermometer 32, and the measured water temperature, i.e., the temperature of the blackbody 33, is stored in the first and second memories 30 and 31. The comparison means 29 then compares the value stored in the first memory 30 with the value stored in the second memory 31, considering the water temperature as well.

Figure 4:
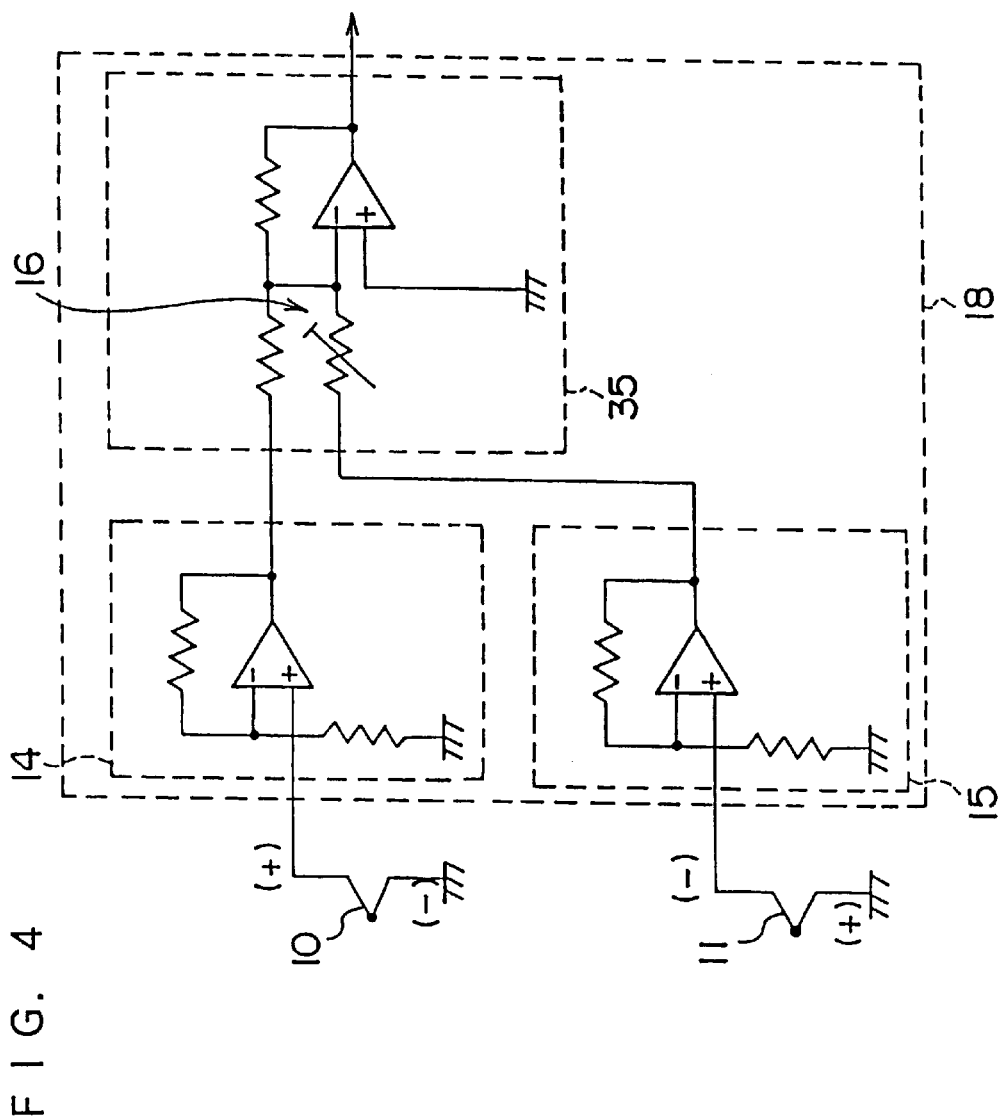
FIG. 4 is a circuit diagram of a temperature difference correction means in FIG. 3.

FIG. 4 is a circuit diagram of the temperature difference correction means 18 in FIG. 3.

The correction coefficient adjusting means 16 and the subtraction means 17 shown in FIG. 3 are realized by an addition circuit 35 in FIG. 4. The correction coefficient adjusting means 16 is realized by a variable resistor whose resistance can be externally changed.

In this embodiment, the temperature difference correction means 18 including the subtraction means 17 is realized by the addition circuit 35. However, since the polarity of the second infrared sensor 11, whose output is input to the addition circuit 35, is opposite that of the first infrared sensor 10, the addition circuit 35 substantially operates to subtract the output from the second infrared sensor 11 from the output from the first infrared sensor 10. In addition, the initial-stage amplification means 14 and 15 are respectively connected to the outputs of the first and second infrared sensors 10 and 11. However, these means may not be required depending on the degrees of sensor outputs and the performance of the addition circuit 35.

Figure 5:
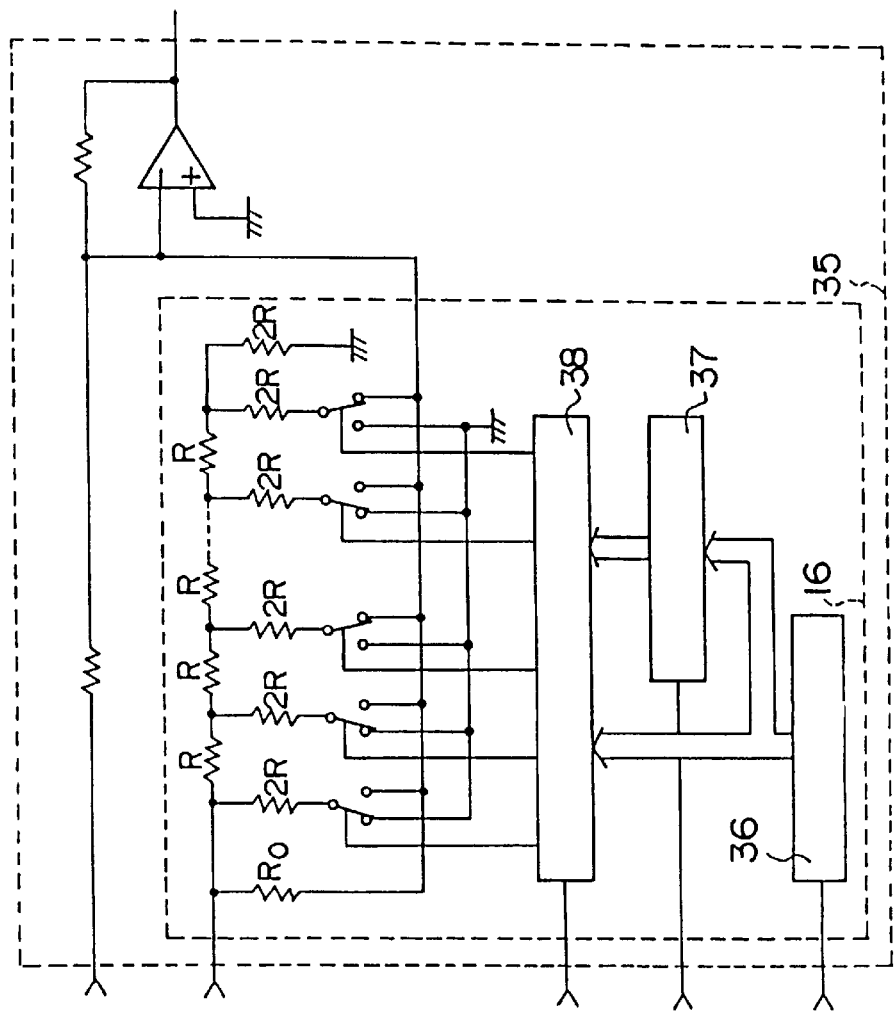
FIG. 5 is a circuit diagram of an addition circuit including the correction coefficient adjusting means in FIG. 4.

FIG. 5 is a circuit diagram of the addition circuit 35 including the correction coefficient adjusting means 16 in FIG. 4.

As the correction coefficient adjusting means 16, a well-known R-2R ladder resistor type C-A converter may be used, as shown in FIG. 5.

Reference numeral 36 denotes a register in which a correction coefficient is set in accordance with an instruction from the correction coefficient generation means 28; 37, a memory for storing the correction coefficient set in the register 36 in accordance with an instruction from the storage instructing means 27; and 38, a selector for selecting the correction coefficient output from the register 36 upon reception of an adjustment mode notification from the adjustment mode notification means 26, selecting the correction coefficient stored in the memory 37 when receiving no adjustment mode notification from the adjustment mode notification means 26, and ON/OFF-controlling the respective switches connected to the resistors on the basis of the selected correction coefficient. With this ON/OFF control, the synthetic resistance of the R-2R ladder resistor type C-A converter changes.

FIG. 6 shows the outer appearance of each device in FIG. 3.

The blackbody 33 comprises a heater 46 for heating water 48 filling a thermostatic chamber 44 having a recess (to be referred to as a "blackbody cavity" hereinafter) in which the probe 2 is to be inserted, and an agitator 47 for making the temperature of the water 48 uniform.

FIG. 6 shows a cutaway view of the main body 4 of the radiation clinical thermometer 1 to allow the board on which a battery 42, an IC 43, and the like are mounted to be seen. The radiation clinical thermometer 1 is connected to the adjusting device 23 through a board connector 41 and vertically moved by an elevator 40 connected to the adjusting device 23, so that the probe 2 is inserted into a probe holding member 45 having a high thermal conductivity and kept at almost the same temperature as the water temperature, and fixed in the blackbody cavity. For example, a display section 39 of the adjusting device 23 displays a correction coefficient, a procedure for adjusting the radiation clinical thermometer 1, an adjustment end mark, or the like.

Figure 7:
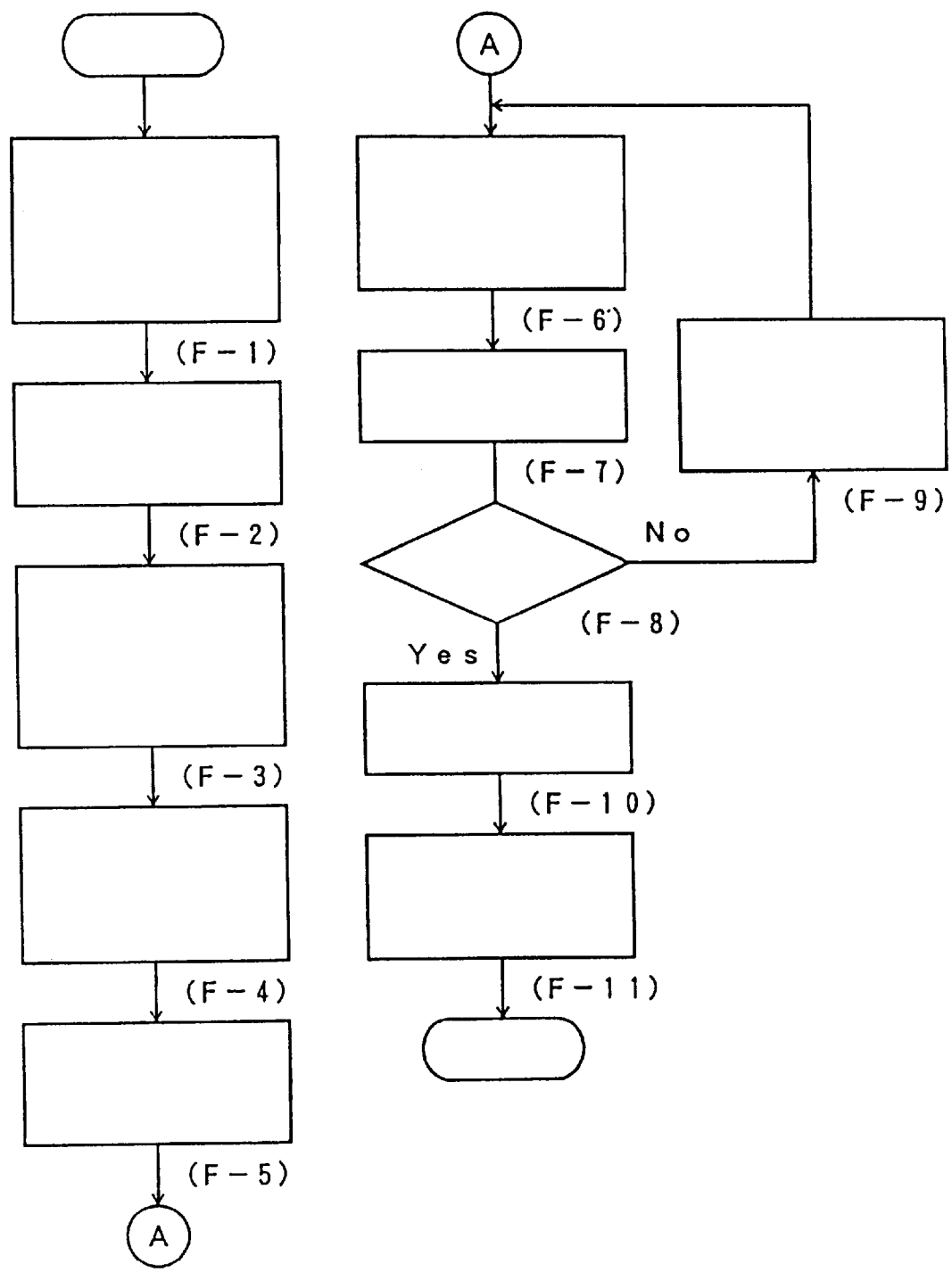
FIG. 7 is a flow chart for explaining the steps in adjusting the correction amount for the radiation clinical thermometer by using the device in FIG. 3.

FIG. 7 is a flow chart for explaining the steps in adjusting the correction amount for the radiation clinical thermometer 1 by using the device shown in FIG. 3.

First of all, the radiation clinical thermometer 1 is left to stand in the surroundings so as to keep the first infrared sensor 10, the optical waveguide means 13, and the temperature difference detection means 54 in an isothermal state at almost room temperature (first temperature difference condition) (F-1). The radiation clinical thermometer 1 is then set on the elevator 40 and connected to the adjusting device 23 through the board connector 41. The adjusting device 23 outputs a signal from the adjustment mode notification means 26 to the selector 38 of the correction coefficient adjusting means 16 to instruct the radiation clinical thermometer 1 to operate in the adjustment mode. In the adjustment mode, the selector 38 selects the correction coefficient from the register 36, and a resistance is determined on the basis of this correction coefficient (F-2). Note that in the initial state in which the board connector 41 is connected to the radiation clinical thermometer 1, a predetermined correction coefficient from the correction coefficient generation means 28 is initially set in the register 36 of the correction coefficient adjusting means 16.

When the switch 24 of the adjusting device 23 is turned on, the elevator 40 lowers the radiation clinical thermometer 1 to insert the probe 2 into the probe holding member 45 so as to receive thermal radiations from the blackbody 33 (F-3).

When the probe 2 is fixed to the probe holding member 45, the adjusting device 23 stores, in the first memory 30, the temperature data (first temperature data) output from the A-D converter 19 of the radiation clinical thermometer 1 (F-4). That is, since the optical waveguide 9 and the second infrared sensor 11 are kept in the isothermal state without any temperature difference therebetween, the output from the second infrared sensor 11 becomes zero, and the output from the correction coefficient adjusting means 16 becomes zero regardless of the value of the initially set correction coefficient. With this operation, the first memory 30 stores the measurement result on the temperature of the blackbody 33 in the state in which there is no temperature difference between the optical waveguide means 13 and the first infrared sensor 10 (the first temperature condition).

When the timer 25 operates, and 10 seconds have elapsed (F-5), the temperature data (second temperature data) output from the A-D converter 19 is stored in the second memory 31 (F-6). In this case, since the probe holding member 45 is kept at almost the same temperature as the water temperature, when 10 seconds have elapsed, the temperature of the optical waveguide means 13 near the probe 2 rises. In contrast to this, the first infrared sensor 10 is still kept at almost room temperature because it is spaced apart from the probe holding member 45. For this reason, a temperature difference occurs between the optical waveguide means 13 and the first infrared sensor 10 (second temperature difference condition). Similarly, a temperature difference occurs between the optical waveguide 9 and the second infrared sensor 11. The second infrared sensor 11 therefore generates an output corresponding to this temperature difference. On the basis of the initially set correction coefficient, the correction coefficient adjusting means 16 generates an output obtained by correcting the output from the second infrared sensor 11. The subtraction means 17 subtracts the corrected output from the second infrared sensor 11 from the output from the first infrared sensor 10. Since the A-D converter 19 converts the output from the subtraction means 17 into a digital value, and outputs the resultant temperature data (second temperature data), the adjusting device 23 stores the second temperature data in the second memory 31.

The comparison means 29 compares the first temperature data stored in the first memory 30 with the second temperature data stored in the second memory 31 (F-7). If the comparison result indicates incoincidence (F-8), the correction coefficient generation means 28 outputs a new correction coefficient to the register 36 of the correction coefficient adjusting means 16 to change the correction coefficient output from the register 36 (F-9). The above processing is then performed again, starting from the sampling of the second temperature data (F-6). That is, the comparison result indicating incoincidence means that the second temperature data stored under the second temperature difference condition differs from the first temperature data stored under the first temperature difference condition in which there is no temperature difference between the first infrared sensor 10 and the optical waveguide means 13. That the first and second temperature data, which should be equal to each other, differ from each other indicates that the correction amount for the second infrared sensor 11 is not correct. Therefore, until a correct correction amount is determined, the correction coefficient is changed to find the resistance of, the correction coefficient adjusting means 16, which makes the temperature of the blackbody 33, measured by the radiation clinical thermometer 1, uniform even if the temperature difference condition changes.

If it is determined in step (F-8) that the comparison result indicates incoincidence, the storage instructing means 27 outputs a signal to the memory 37 of the correction coefficient adjusting means 16 to record, on the memory 37, the correction coefficient currently set in the register 36 (F-10). The radiation clinical thermometer 1 is then raised by the elevator 40 and removed from the board connector 41 (F-11). When the radiation clinical thermometer 1 is disconnected from the adjusting device 23 in this manner, no signal indicating the adjustment mode is output to the selector 38 of the correction coefficient adjusting means 16. As a result, the selector 38 selects the correction coefficient from the memory 37, and a resistance is determined on the basis of this correction coefficient.

The temperature of the blackbody 33 under the first temperature difference condition may be slightly different from that under the second temperature difference condition. It suffices, therefore, if the actual temperature of the blackbody 33 is measured by the water thermometer 32 and stored in the first and second memories 30 and 31 every time the first and second temperature data are obtained, and the comparison means 29 compares the first and second temperature data with each other, considering the actual temperature. Even if there is no temperature difference between the first infrared sensor 10 and the optical waveguide means 13, the output from the A-D converter 19 changes as the temperature of the blackbody 33 changes. If, therefore, there is a difference between the temperature of the blackbody 33 upon storage of the first temperature data and the temperature of the blackbody 33 upon storage of the second temperature data, the first and second temperature data may be adjusted in accordance with this difference.

In this embodiment, the first temperature difference condition is the condition in which the optical waveguide means 13 and the first infrared sensor 10 are set in an isothermal state. However, the present invention is not limited to this; a predetermined temperature difference may be set.

In this embodiment, under the two types of temperature difference conditions, i.e., the first and second temperature difference conditions, the correction amount is adjusted such that the temperature of the blackbody 33 which is measured by the radiation clinical thermometer 1 is made uniform. However, the present invention is not limited to this; adjustment may be performed such that the temperature of the blackbody 33 which is measured by the radiation clinical thermometer 1 is made uniform under three or more types of temperature difference conditions.

In this embodiment, the adjusting device 23 adjusts the correction amount until the first temperature data becomes equal to the second temperature data. However, the present invention is not limited to this; adjustment may be performed such that the difference between the first and second temperature data falls within a predetermined range (in which the measurement accuracy is not affected).

Figure 8:
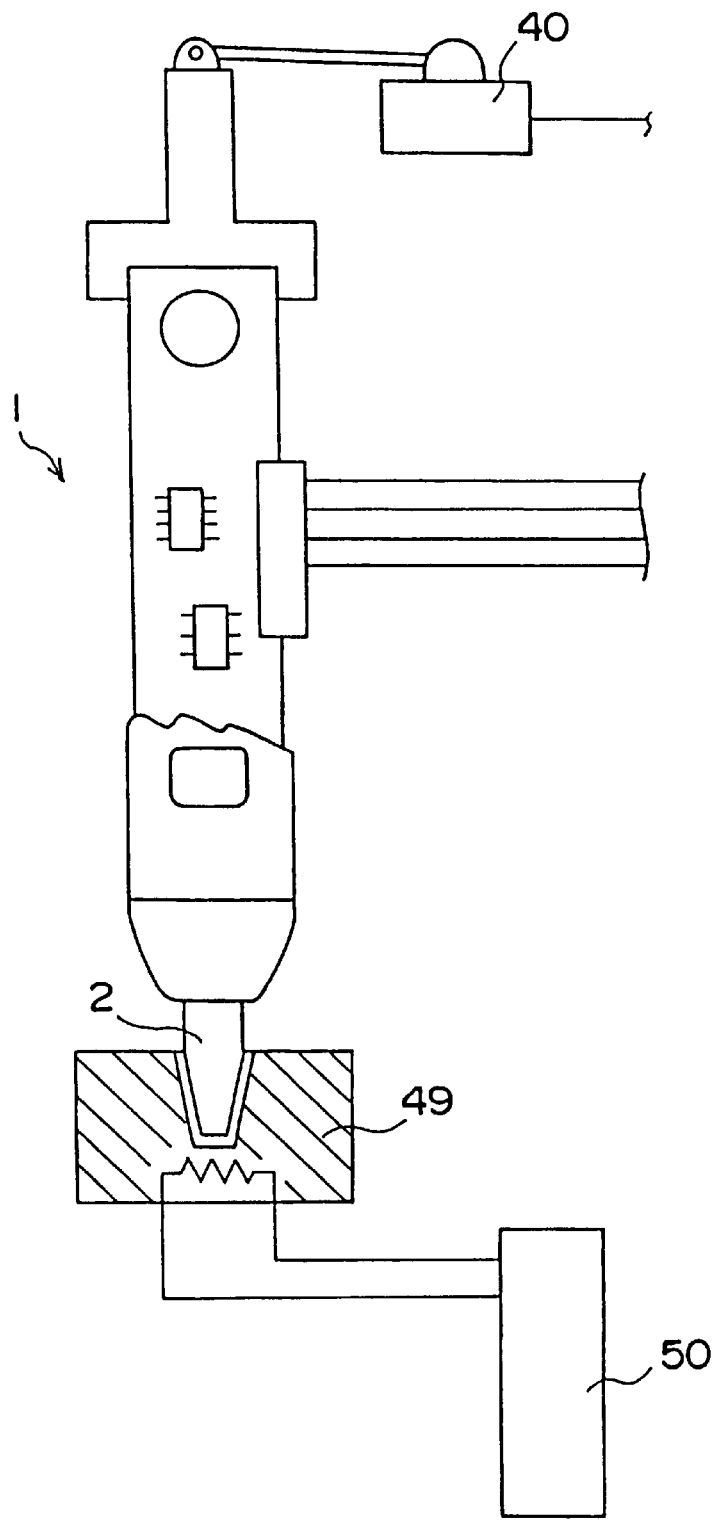
FIG. 8 is a view for explaining temperature difference conditions under which the probe is heated.

In this embodiment, the second temperature difference condition is set by causing the probe holding member 45 in the blackbody 33 to hold the probe 2 for a predetermined period of time. However, the present invention is not limited to this; the probe 2 may be heated by a heater block 49 heated by a heater device 50 to set the second temperature difference condition, as shown in FIG. 8.

Figure 9:
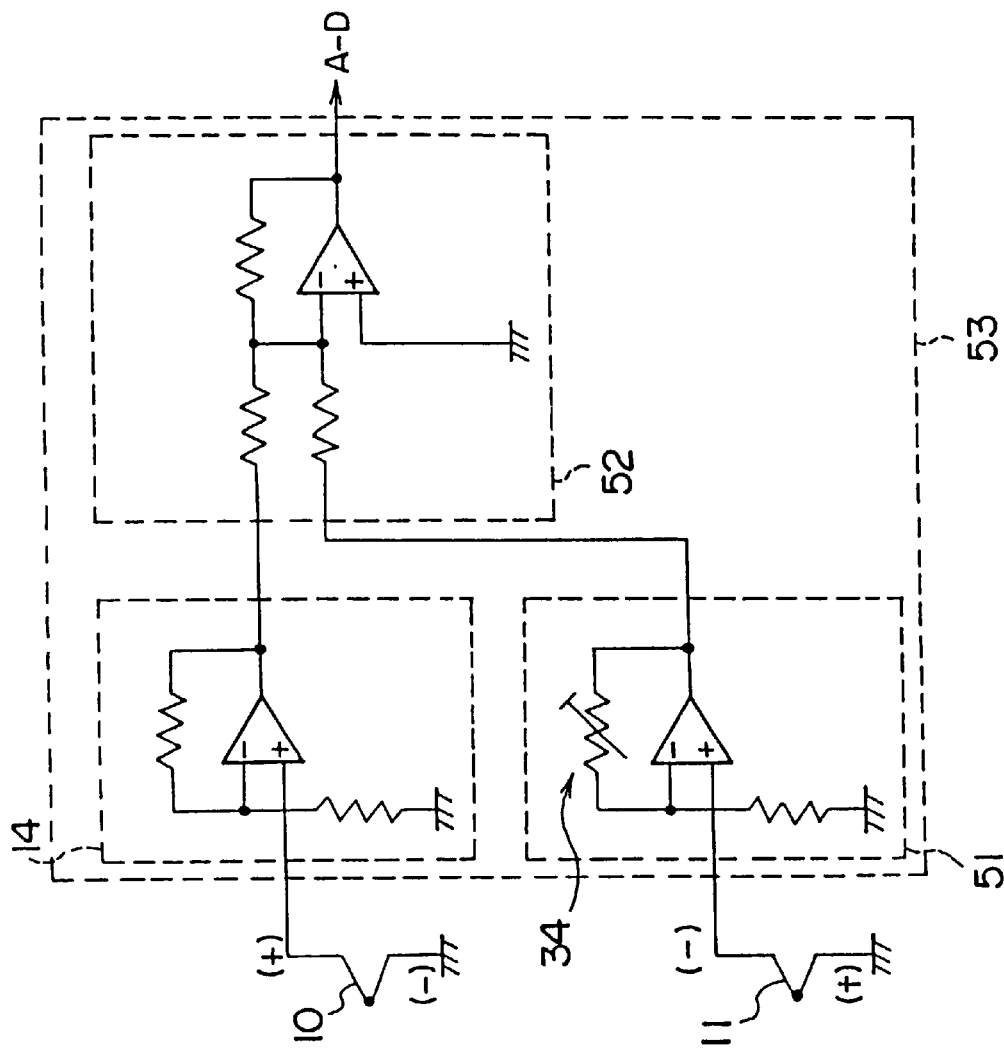
FIG. 9 is a view for explaining another example of the place where the correction coefficient adjusting means is arranged.

In this embodiment, the addition circuit 35 incorporates the correction coefficient adjusting means 16, as shown in FIG. 4. However, the present invention is not limited to this. For example, as shown in FIG. 9, a second initial-stage amplification means 51 may incorporate a correction coefficient adjusting means 34.

Figure 10:
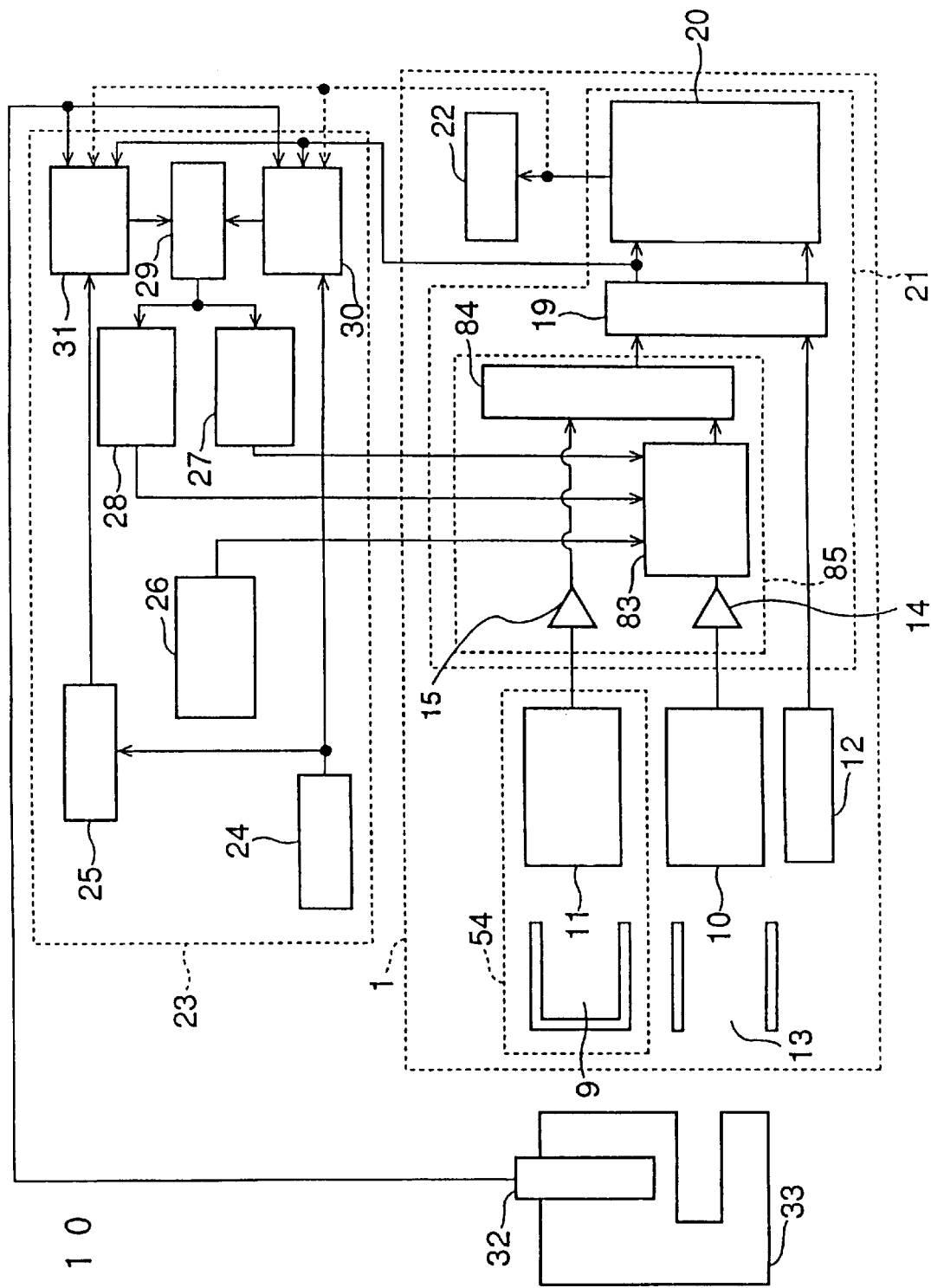
FIG. 10 is a view for explaining still another example of the place where the correction coefficient adjusting means is arranged.
Figure 11:
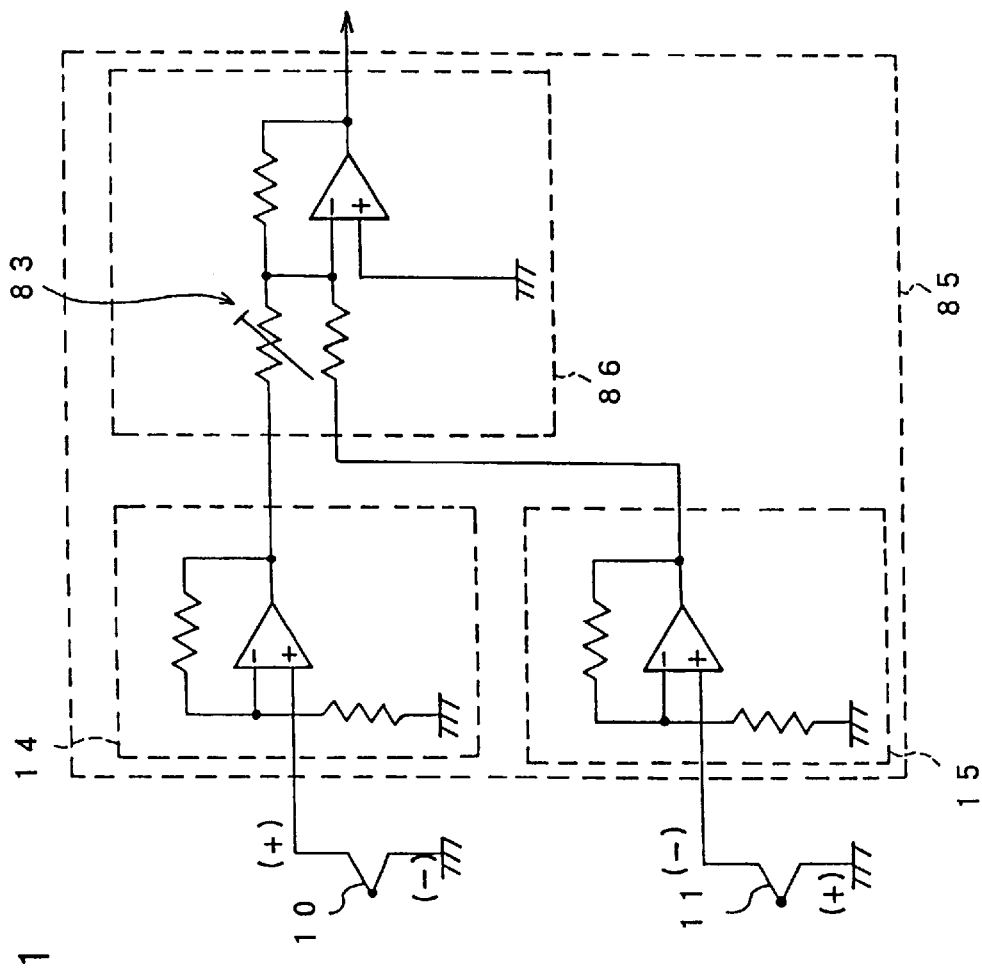
FIG. 11 is a view for explaining still another example of the place where the correction coefficient adjusting means is arranged.

As shown in FIG. 3, this embodiment includes the correction coefficient adjusting means 16 for adjusting the correction coefficient for the signal output from the second infrared sensor 11, and the adjusted output from the second infrared sensor 11 is subtracted from the output from the first infrared sensor 10. However, the present invention is not limited to this. For example, as shown in FIG. 10, a correction coefficient adjusting means 83 may be used to adjust the output from the first infrared sensor 10 to a proper ratio, and the adjusted output from the first infrared sensor 10 may subtract from the output from the second infrared sensor 11, thereby detecting infrared radiations from the object without any influences of the temperature of the optical waveguide 8. FIG. 11 is a circuit diagram of a temperature difference correction means 85 in FIG. 10 which corresponds to this arrangement.

In this embodiment, the first and second temperature data are obtained from the outputs from the A-D converter 19. However, the present invention is not limited to this.

For example, as indicated by the dotted arrows in FIGS. 3 and 10, the outputs from the temperature data calculation means 20 may be obtained as the first and second temperature data.

Although the first and second memories 30 and 31, the comparison means 29, and the like are arranged in the adjusting device 23, these components may be arranged in the radiation clinical thermometer 1.

Figure 12:
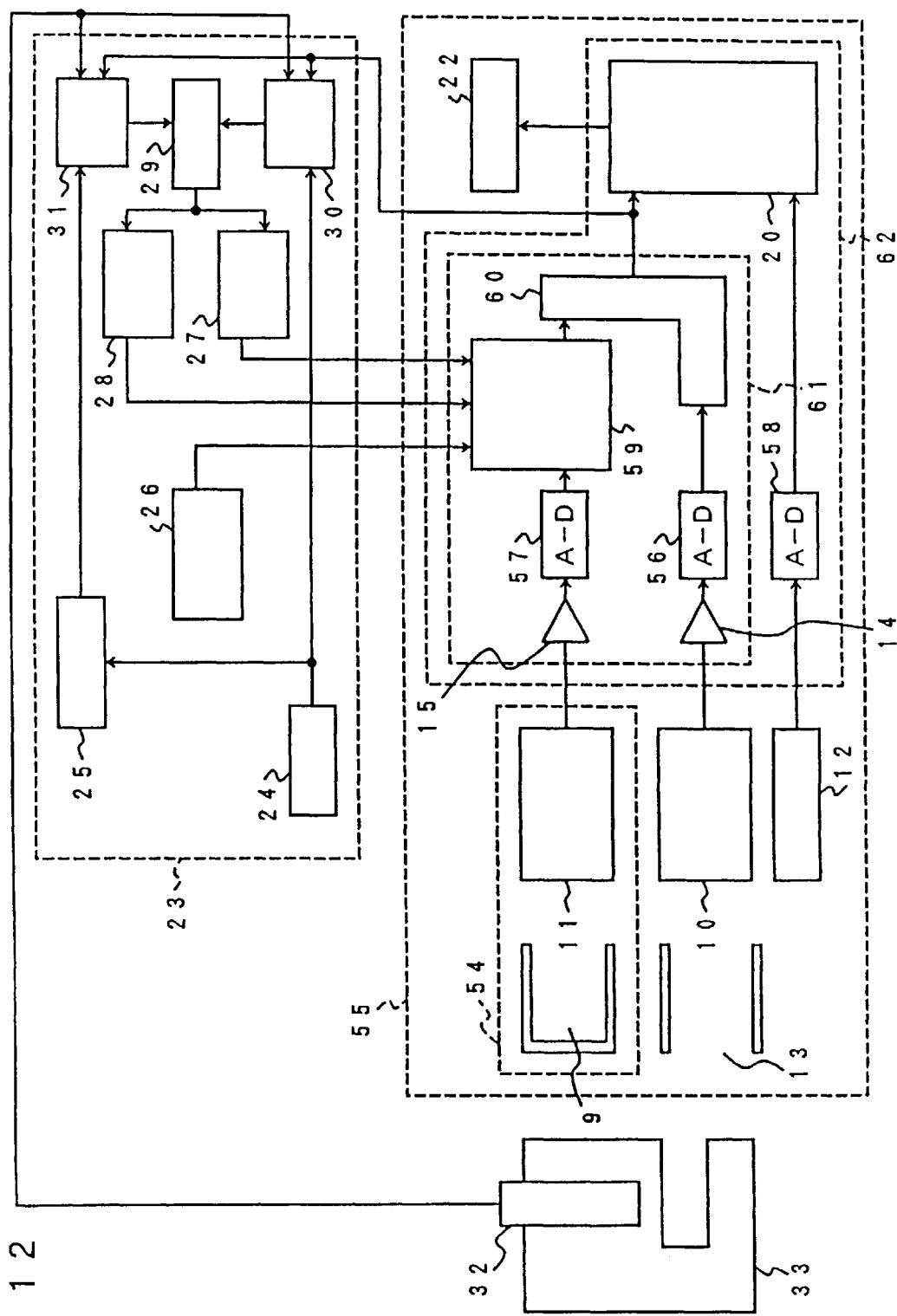
FIG. 12 is a schematic block diagram showing a radiation clinical thermometer and a device which perform correction amount adjustment for the radiation clinical thermometer according to the second embodiment of the present invention.

FIG. 12 is a schematic block diagram showing a radiation clinical thermometer 55 and a device which perform correction amount adjustment for the radiation clinical thermometer according to the second embodiment of the present invention. The same reference numerals in FIG. 12 denote the same parts as in FIG. 3, and a description thereof will be omitted.

In this embodiment, A-D converters 57 and 56 in a temperature difference correction means 61 perform digital conversion on the input stages of a correction coefficient adjusting means 59 and a subtraction means 60. Reference numeral 58 denotes an A-D converter for converting the output from a temperature sensor 12 into digital data.

Figure 13:
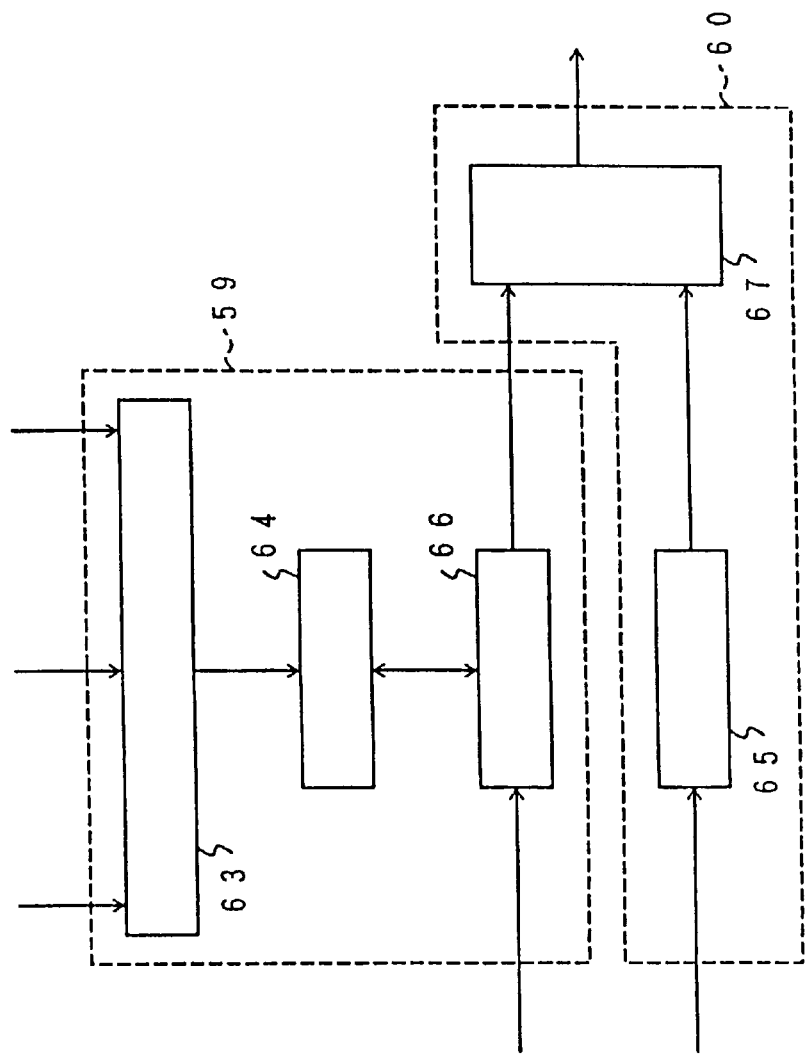
FIG. 13 is a block diagram showing a correction coefficient adjusting means and a subtraction means in FIG. 12.

FIG. 13 is a block diagram showing the correction coefficient adjusting means 59 and the subtraction means 60 in FIG. 12.

The correction coefficient adjusting means 59 comprises a contribution setting means 63 for setting and outputting a contribution on the basis of the signals from an adjustment mode notification means 26, a storage instructing means 27, and a correction coefficient generation means 28, a multiplication circuit 64 for calculating the corrected output from a second infrared sensor 11 by multiplying the contribution from the contribution setting means 63 and the output from the A-D converter 57 which is recorded on a memory 66, and the memory 66 for storing the corrected output from the second infrared sensor 11 in place of the output from the second infrared sensor 11.

The subtraction means 60 comprises a memory 65 for storing the output from the A-D converter 56, and a substraction circuit 67 for subtracting the corrected output from the second infrared sensor 11, stored in the memory 66, from the output from a first infrared sensor 10, stored in the memory 65.

In this embodiment, correction amount adjustment is performed as follows. First of all, the contribution setting means 63 sets a contribution on the basis of the correction coefficient from the correction coefficient generation means 28. The multiplication circuit 64 then corrects the output from the second infrared sensor 11 on the basis of the set contribution. The substraction circuit 67 subtracts the corrected output from the second infrared sensor 11 from the output from the first infrared sensor 10. In this case, adjustment is performed until a contribution that makes the outputs from the substraction circuit 67, stored in first and second memories 30 and 31, uniform under the first and second temperature difference conditions is determined. Since the manner of setting the temperature difference conditions is the same as in the first embodiment, a description thereof will be omitted.

This embodiment includes the correction coefficient adjusting means 59 for adjusting the correction coefficient for the signal from the second infrared sensor 11, as shown in FIG. 12. However, the present invention is not limited to this. For example, the embodiment may include a correction coefficient adjusting means for adjusting the correction coefficient for the signal from the first infrared sensor 10.

Figure 14:
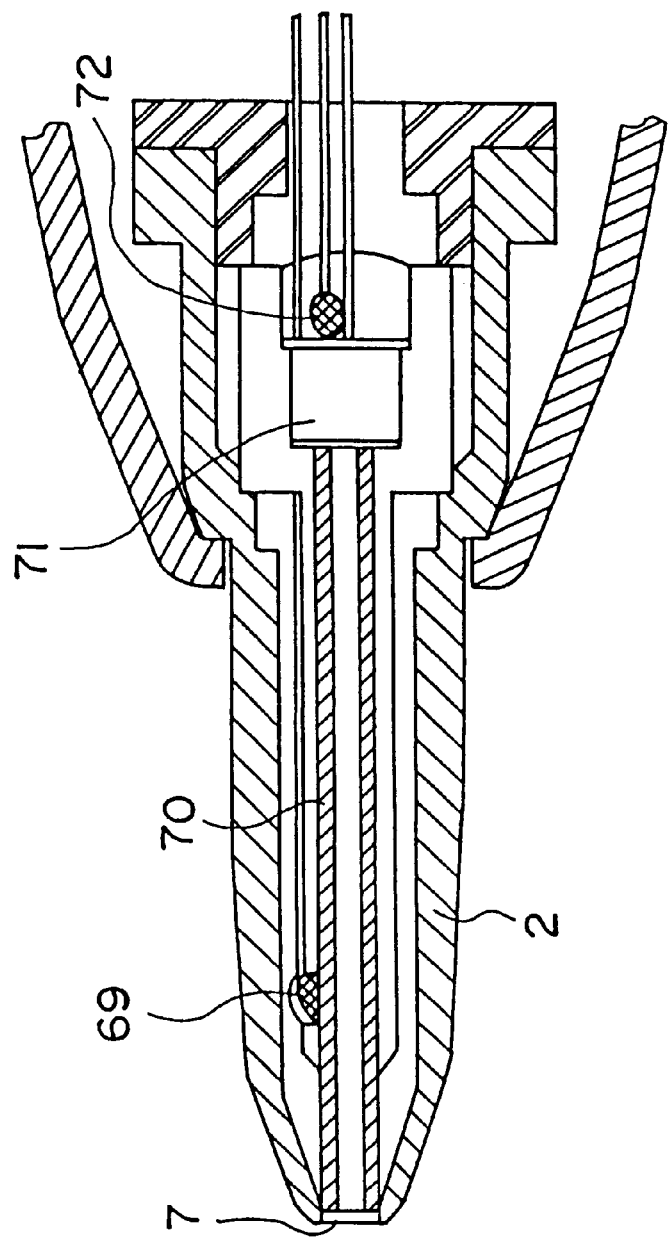
FIG. 14 is a partially cutaway sectional view of the probe of a radiation clinical thermometer according to the third embodiment of the present invention.

FIG. 14 is a partially cutaway sectional view of the probe of a radiation clinical thermometer according to the third embodiment of the present invention. The same reference numerals in FIG. 14 denote the same parts as in FIG. 2, and a description thereof will be omitted.

In the first and second embodiments, the temperature difference detection means 54 is constituted by the optical waveguide 9 and the second infrared sensor 11. In this embodiment, a temperature difference detection means is constituted by a second temperature sensor 69 for measuring the temperature of an optical waveguide 70 and a first temperature sensor 72 for measuring the temperature of an infrared sensor 71.

Reference numeral 70 denotes the optical waveguide for efficiently focusing thermal radiations from the eardrum of an object to be measured. This optical waveguide consists of the same material as that for the optical waveguide 8 in FIG. 2, and has undergone the same inner surface process as that of the waveguide 8. Reference numeral 69 denotes a second temperature sensor for measuring the temperature of the optical waveguide 70; and 71, a sensor for detecting thermal radiations emitted from the object and focused by the optical waveguide 70. This sensor also detects thermal radiations from the optical waveguide 70 itself when there is a temperature difference between the infrared sensor 71 and the optical waveguide 70. Reference numeral 72 denotes a first temperature sensor for measuring the temperature of the infrared sensor 71.

Figure 15:
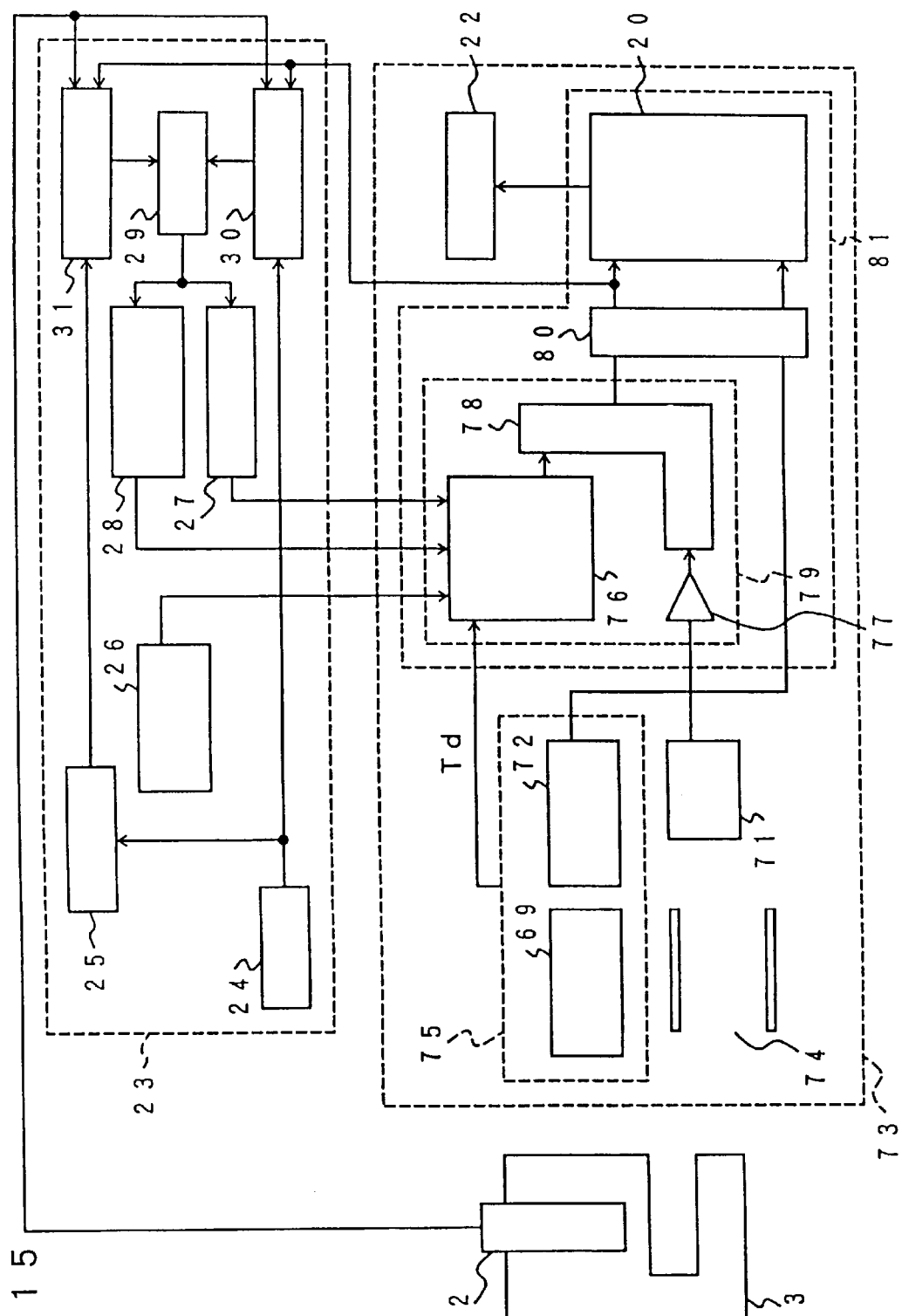
FIG. 15 is a schematic block diagram showing a radiation clinical thermometer and a device which perform correction amount adjustment for the radiation clinical thermometer in FIG. 14.

FIG. 15 is a schematic block diagram showing a radiation clinical thermometer 73 and a device which perform correction amount adjustment for the radiation clinical thermometer in FIG. 14. The same reference numerals in FIG. 15 denote the same parts as in FIG. 3, and a description thereof will be omitted.

Referring to FIG. 15, the radiation clinical thermometer 73 comprises an optical waveguide means 74 which are constituted by a filter 7 and the optical waveguide 70 to focus thermal radiations from a blackbody 33, the infrared sensor 71, the temperature difference detection means 75 constituted by the second temperature sensor 69 and the first temperature sensor 72, a temperature calculation means 81 for calculating the temperature of the object on the basis of the outputs from the temperature difference detection means 75, the infrared sensor 71, and the first temperature sensor 72, and a display means 22 for displaying the temperature as the calculation result obtained by the temperature calculation means 81.

The temperature calculation means 81 comprises a temperature difference correction means 79 for correcting the error based on the difference in temperature between the optical waveguide 70 and the infrared sensor 71, an A-D converter 80 for converting analog data into digital data, and a temperature data calculation means 20 for calculating the temperature data of the object on the basis of the digital output from the temperature difference correction means 79 and the output from the first temperature sensor 72. The temperature difference correction means 79 comprises an initial-stage amplification means 77 for amplifying the detection signal from the infrared sensor 71, a correction coefficient adjusting means 76 for adjusting the correction coefficient to correct the error based on the temperature difference, and a subtraction means 78 for subtracting the detection signal from the temperature difference detection means 75, which is adjusted to a proper value by the correction coefficient adjusting means 76, from the detection signal from the infrared sensor 71.

Figure 16:
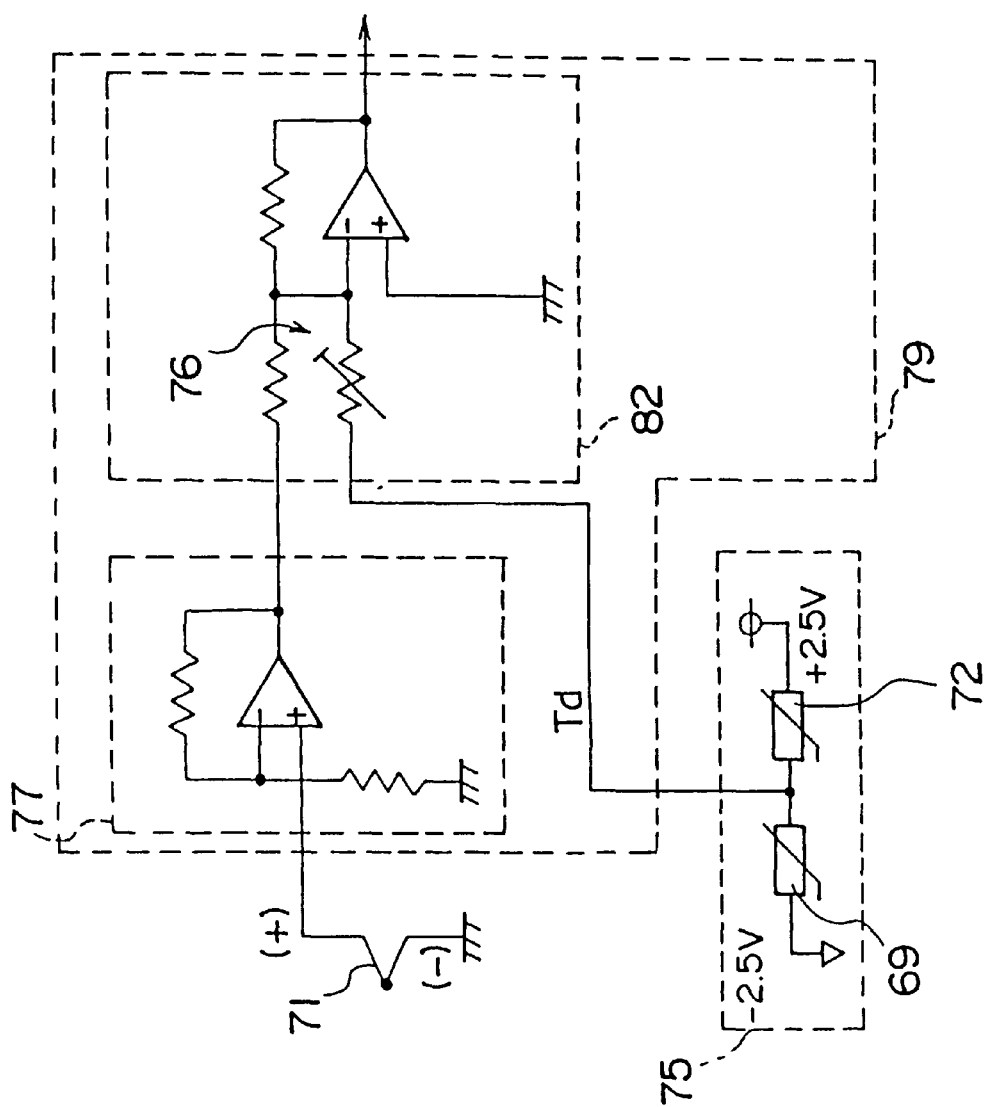
FIG. 16 is a circuit diagram showing a temperature difference correction means and a temperature difference detection means in FIG. 15.

FIG. 16 is a circuit diagram showing the temperature difference correction means 79 and the temperature difference detection means 75 in FIG. 15.

The correction coefficient adjusting means 76 and the subtraction means 78 are realized by an addition circuit 82 in FIG. 16. Similar to the correction coefficient adjusting means 16 in FIG. 5, as the correction coefficient adjusting means 76, an R-2R ladder resistor type C-A converter may be used. The correction coefficient adjusting means 76 includes a register 36 in which a correction coefficient is set in accordance with an instruction from a correction coefficient generation means 28, a memory 37 for storing the correction coefficient set in the register 36, in accordance with an instruction from the storage instructing means 27, and a selector 38 for selecting the correction coefficient output from the register 36 upon reception of an adjustment mode notification from an adjustment mode notification means 26, selecting the correction coefficient stored in the memory 37 when receiving no adjustment mode notification from the adjustment mode notification means 26, and ON/OFF-controlling the respective switches connected to the resistors on the basis of the selected correction coefficient. With this ON/OFF control, the synthetic resistance of the R-2R ladder resistor type C-A converter changes.

In the temperature difference detection means 75, the first temperature sensor 72 and the second temperature sensor 69 are series-connected, and the two terminals of this series circuit are respectively connected to a (+) power supply and a (−) power supply. These power supplies are set to +2.5 V and −2.5 V, i.e., the same voltage with respect to the reference voltage. The temperature difference detection means 75 outputs a temperature difference signal Td having undergone voltage division at the first temperature sensor 72 and the second temperature sensor 69. Note that the two temperature sensors 72 and 69 consist of thermistors having similar electrical characteristics.

In this embodiment, correction amount adjustment is performed as follows. First of all, a correction coefficient is set in the register 36 in accordance with an instruction from the correction coefficient generation means 28. The resistance of the correction coefficient adjusting means 76 is then determined on the basis of this correction coefficient. The temperature difference signal Td from the temperature difference detection means 75 becomes a corrected temperature difference signal through the correction coefficient adjusting means 76. The subtraction means 78 subtracts the corrected temperature difference signal from the output from the infrared sensor 71 which is amplified by the initial-stage amplification means 77. In this case, adjustment is performed until a correction coefficient that makes the outputs from the A-D converter 80, stored in first and second memories 30 and 31, equal to each other is determined. Since the manner of setting the temperature difference conditions is the same as in the first embodiment, a description thereof will be omitted.

This embodiment includes the correction coefficient adjusting means 76 for adjusting the correction coefficient for the signal from the temperature difference detection means 75, as shown in FIG. 15. However, the present invention is not limited to this. For example, the embodiment may include a correction coefficient adjusting means for adjusting the correction coefficient for the signal from the infrared sensor 71.

In the present invention, as each infrared sensor, for example, a sensor using a thermopile or a pyroelectric element may be used. In addition, the temperature sensors are not limited to the thermistors, and any elements can be used as long as they have temperature characteristics. For example, diodes may be used.

Industrial Applicability

Although the present invention has been disclosed for the radiation clinical thermometers, the invention can be applied to general radiation thermometers.

What is claimed is:

1. A radiation clinical thermometer comprising an infrared sensor for outputting an infrared detection signal upon reception of thermal radiations from an object to be measured, optical waveguide means for guiding the thermal radiations from the object to be measured to said infrared sensor, a temperature sensor for measuring a reference temperature and outputting a reference temperature signal, temperature difference detection means for detecting a temperature difference between said infrared sensor and said optical waveguide means and outputting a temperature difference signal, and temperature calculation means for receiving the infrared detection signal, the reference temperature signal, and the temperature difference signal and calculating a temperature data signal by correcting an error based on the temperature difference, wherein said temperature calculation means includes correction coefficient adjusting means for adjusting a correction coefficient for the temperature difference signal or the infrared detection signal.

2. A radiation clinical thermometer comprising an infrared sensor for outputting an infrared detection signal upon reception of thermal radiations from an object to be measured, optical waveguide means for guiding the thermal radiations from the object to be measured to said infrared sensor, a temperature sensor for measuring a reference temperature and outputting a reference temperature signal, temperature difference detection means for detecting a temperature difference between said infrared sensor and said optical waveguide means and outputting a temperature difference signal, and temperature calculation means for receiving the infrared detection signal, the reference temperature signal, and the temperature difference signal and calculating a temperature data signal by correcting an error based on the temperature difference, wherein said temperature calculation means includes correction coefficient adjusting means for adjusting a correction coefficient for the temperature difference signal.

3. A radiation clinical thermometer according to claim 2, wherein said temperature calculation means comprises temperature difference correction means for subtracting the temperature difference signal from the infrared detection signal, and temperature data calculation means for calculating the temperature data on the basis of an output signal from said temperature difference correction means and the reference temperature signal, said temperature difference correction means including said correction coefficient adjusting means.

4. A radiation clinical thermometer according to claim 3, wherein said temperature difference correction means comprises subtraction means for subtracting the temperature difference signal from the infrared detection signal in an analog manner, and said correction coefficient adjusting means comprises adjusting means for adjusting a contribution of the temperature difference signal with respect to said subtraction means.

5. A radiation clinical thermometer according to claim 4, wherein subtraction means comprises an addition circuit constituted by an operational amplifier for receiving the infrared detection signal and the temperature difference signal, and said correction coefficient adjusting means comprises resistance adjusting means for changing a resistance of a temperature difference signal input resistor.

6. A radiation clinical thermometer according to claim 5, wherein resistance adjusting means comprises a plurality of resistors, switching means for switching and connecting said resistors, and a control circuit for controlling said switching means.

7. A radiation clinical thermometer according to claim 3, wherein said temperature difference correction means comprises subtraction means for subtracting the temperature difference signal from the infrared detection signal in a digital manner, and said correction coefficient adjusting means comprises adjusting means for adjusting a contribution of the temperature difference signal with respect to said subtraction means.

8. A radiation clinical thermometer according to claim 7, wherein said subtraction means comprises an infrared detection signal memory and a temperature difference signal memory for storing the infrared detection signal and the temperature difference signal as digital values, respectively, and a digital subtraction circuit for subtracting data in said two memories from each other, and said correction coefficient adjusting means comprises a multiplication circuit for multiplying the value stored in said temperature difference signal memory by the contribution, and contribution setting means for setting the contribution.

9. A radiation clinical thermometer according to claim 3, wherein said optical waveguide means comprises a first optical waveguide portion having an open distal end, said infrared sensor comprises a first infrared sensor arranged at a proximal end of said first optical waveguide portion, and said temperature difference detection means comprises a second optical waveguide portion kept in substantially the same temperature state as that for said first optical waveguide portion and having a sealed distal end, and a second infrared sensor arranged at a proximal end of said second optical waveguide portion.

10. A radiation clinical thermometer according to claim 3, wherein said optical waveguide means comprises an optical waveguide member having an open distal end, said infrared sensor comprises a thermopile arranged at a proximal end of said optical waveguide member, and said temperature difference detection means comprises a first temperature sensor for measuring a temperature of said optical waveguide member and a second temperature sensor for measuring a temperature of said thermopile.

11. A radiation clinical thermometer according to claim 9, wherein said temperature difference correction means comprises subtraction means for subtracting the infrared detection signal output from said first infrared sensor and the temperature difference signal output from said second infrared sensor from each other in an analog manner, and said correction coefficient adjusting means comprises adjusting means for adjusting a contribution of the temperature difference signal with respect to said subtraction means.

12. A radiation clinical thermometer according to claim 11, wherein said subtraction means comprises an addition circuit constituted by an operational amplifier for receiving the infrared detection signal and the temperature difference, and said correction coefficient adjusting means comprises resistance adjusting means for changing a resistance of a temperature difference signal input resistor.

13. A radiation clinical thermometer according to claim 12, wherein said resistance adjusting means comprises a plurality of resistors, switching means for switching and connecting said resistors, and a control circuit for controlling said switching means.

14. A radiation clinical thermometer according to claim 9, wherein said temperature difference correction means comprises first initial-stage amplification means for amplifying the infrared detection signal output from said first thermopile, second initial-stage amplification means for amplifying the temperature difference signal output from said second thermopile, and subtraction means for subtracting, in an analog manner, the temperature difference signal output from said second initial-stage amplification means from the infrared detection signal output from said first initial-stage amplification means, and said correction coefficient adjusting means comprises an amplification factor adjusting means for said second initial-stage amplification means.

15. A radiation clinical thermometer according to claim 2, wherein said correction coefficient adjusting means is adjusted on the basis of a first output data signal output under a first temperature difference condition for said infrared sensor and said optical waveguide means and a second output data signal output under a second temperature difference condition for said infrared sensor and said optical waveguide means.

16. A radiation clinical thermometer according to claim 15, wherein the first temperature difference condition is a condition in which a temperature of said infrared sensor is substantially equal to a temperature of said optical waveguide means, and the second temperature difference condition is a condition in which the temperature of said infrared sensor differs from the temperature of said optical waveguide means.

17. A radiation clinical thermometer according to claim 15, wherein the second temperature difference condition is set by heating said optical waveguide means.

18. A temperature error correction method for a radiation clinical thermometer comprising an infrared sensor for outputting an infrared detection signal upon reception of thermal radiations from an object to be measured, optical waveguide means for guiding the thermal radiations from the object to be measured to said infrared sensor, a temperature sensor for measuring a reference temperature and outputting a reference temperature signal, temperature difference detection means for detecting a temperature difference between said infrared sensor and said optical waveguide means and outputting a temperature difference signal, and temperature calculation means for receiving the infrared detection signal, the reference temperature signal, and the temperature difference signal and calculating a temperature data signal by correcting an error based on the temperature difference, the method comprising the step of arranging temperature difference correction means for adjusting a contribution of the temperature difference signal or the infrared detection signal based on a temperature difference between said infrared sensor and said optical waveguide means, and arranging said radiation clinical thermometer so as to receive thermal radiations from a blackbody kept at a constant temperature, the step of detecting a first output data signal output under a first temperature difference condition for said infrared sensor and said optical waveguide means, the step of detecting a second output data signal output under a second temperature difference condition for said infrared sensor and said optical waveguide means, the step of comparing the first and second output data and outputting comparison data, and the step of adjusting said correction coefficient adjusting means on the basis of the comparison data such that the first output data signal coincides with the second output data signal.

19. A temperature error correction method for a radiation clinical thermometer comprising an infrared sensor for outputting an infrared detection signal upon reception of thermal radiations from an object to be measured, optical waveguide means for guiding the thermal radiations from the object to be measured to said infrared sensor, a temperature sensor for measuring a reference temperature and outputting a reference temperature signal, temperature difference detection means for detecting a temperature difference between said infrared sensor and said optical waveguide means and outputting a temperature difference signal, and temperature calculation means for receiving the infrared detection signal, the reference temperature signal, and the temperature difference signal and calculating a temperature data signal by correcting an error based on the temperature difference, the method comprising the step of arranging temperature measuring means for measuring a temperature of a blackbody, and temperature difference correction means for adjusting a contribution of the temperature difference signal or the infrared detection signal based on a temperature difference between said infrared sensor and said optical waveguide means, and arranging said radiation clinical thermometer so as to receive thermal radiations from a blackbody kept at a constant temperature, the step of detecting a first output data signal output under a first temperature difference condition for said infrared sensor and said optical waveguide means, the step of detecting a second output data signal output under a second temperature difference condition for said infrared sensor and said optical waveguide means, the step of measuring a measurement temperature difference between a measurement temperature of the blackbody under the first temperature difference condition and a measurement temperature of the blackbody under the second temperature difference condition, the step of outputting a temperature difference between the first output data signal and the second output data signal, and the step of adjusting said correction coefficient adjusting means on the basis of the comparison data such that the temperature difference coincides with the measurement temperature difference.

20. A temperature error correction method for a radiation clinical thermometer comprising an infrared sensor for outputting an infrared detection signal upon reception of thermal radiations from an object to be measured, optical waveguide means for guiding the thermal radiations from the object to be measured to said infrared sensor, a temperature sensor for measuring a reference temperature and outputting a reference temperature signal, temperature difference detection means for detecting a temperature difference between said infrared sensor and said optical waveguide means and outputting a temperature difference signal, and temperature calculation means for receiving the infrared detection signal, the reference temperature signal, and the temperature difference signal and calculating a temperature data signal by correcting an error based on the temperature difference, the method comprising the step of arranging temperature difference correction means for adjusting a contribution of the temperature difference signal based on a temperature difference between said infrared sensor and said optical waveguide means, and arranging said radiation clinical thermometer so as to receive thermal radiations from a blackbody kept at a constant temperature, the step of detecting a first output data signal output under a first temperature difference condition for said infrared sensor and said optical waveguide means, the step of detecting a second output data signal output under a second temperature difference condition for said infrared sensor and said optical waveguide means, the step of comparing the first and second output data and outputting comparison data, and the step of adjusting said correction coefficient adjusting means on the basis of the comparison data such that the first output data signal coincides with the second output data signal.

21. A temperature error correction method for a radiation clinical thermometer comprising an infrared sensor for outputting an infrared detection signal upon reception of thermal radiations from an object to be measured, optical waveguide means for guiding the thermal radiations from the object to be measured to said infrared sensor, a temperature sensor for measuring a reference temperature and outputting a reference temperature signal, temperature difference detection means for detecting a temperature difference between said infrared sensor and said optical waveguide means and outputting a temperature difference signal, and temperature calculation means for receiving the infrared detection signal, the reference temperature signal, and the temperature difference signal and calculating a temperature data signal by correcting an error based on the temperature difference, the method comprising the step of arranging temperature measuring means for measuring a temperature of a blackbody, and temperature difference correction means for adjusting a contribution of the temperature difference signal based on a temperature difference between said infrared sensor and said optical waveguide means, and arranging said radiation clinical thermometer so as to receive thermal radiations from a blackbody kept at a constant temperature, the step of detecting a first output data signal output under a first temperature difference condition for said infrared sensor and said optical waveguide means, the step of detecting a second output data signal output under a second temperature difference condition for said infrared sensor and said optical waveguide means, the step of measuring a measurement temperature difference between a measurement temperature of the blackbody under the first temperature difference condition and a measurement temperature of the blackbody under the second temperature difference condition, the step of outputting a temperature difference between the first output data signal and the second output data signal, and the step of adjusting said correction coefficient adjusting means on the basis of the comparison data such that the temperature difference coincides with the measurement temperature difference.

22. A temperature error correction method for a radiation clinical thermometer according to claim 20, wherein the first temperature difference condition is a condition in which a temperature of said infrared sensor is substantially equal to a temperature of said optical waveguide means, and the second temperature difference condition is a condition in which the temperature of said infrared sensor differs from the temperature of said optical waveguide means.

23. A temperature error correction method for a radiation clinical thermometer according to claim 20, wherein the second temperature difference condition is set by heating said optical waveguide means.

24. A temperature error correction method for a radiation clinical thermometer according to claim 20, wherein said temperature correction means comprises an addition circuit constituted by an operational amplifier for receiving the infrared detection signal and the temperature difference signal, the step of adjusting said temperature difference correction means comprises adjusting a resistance of a temperature difference signal input resistor of said operational amplifier.

25. A temperature error correction method for a radiation clinical thermometer according to claim 24, wherein the first and second output data signals are output signals from said operational amplifier constituting said addition circuit.

26. A temperature error correction method for a radiation clinical thermometer according to claim 20, wherein the first and second output data signals are temperature data signals.

* * * * *